United States Patent [19]

Nishimoto et al.

[11] 4,265,693
[45] May 5, 1981

[54] METHOD OF MOLDING TUBULAR LAMINATE

[75] Inventors: Yoshiharu Nishimoto; Kengo Yamazaki, both of Iwaki, Japan

[73] Assignee: Kureha Kagaku Kogyo Kabushiki Kaisha, Tokyo, Japan

[21] Appl. No.: 76,758

[22] Filed: Sep. 18, 1979

[30] Foreign Application Priority Data

Sep. 29, 1978 [JP] Japan .................................. 53/119077

[51] Int. Cl.³ ........................................... B29D 23/04
[52] U.S. Cl. .................................... 156/218; 156/243; 156/244.11; 156/244.13; 156/244.14; 156/500; 264/512; 264/514; 264/515; 264/545; 264/563; 425/114; 425/131.1; 425/133.1; 425/133.5; 425/325; 425/465; 425/466
[58] Field of Search .............. 156/243, 244.11, 244.13, 156/244.14, 218, 500; 264/173, 209, 210.1, 210.6, 510, 512, 514, 515, 545, 563; 425/97, 114, 131.1, 133.1, 133.5, 325, 461, 465, 466, 516

[56] References Cited

U.S. PATENT DOCUMENTS

| 3,476,627 | 11/1969 | Squires | 425/133.5 |
| 3,860,372 | 1/1975 | Newman | 425/133.1 |
| 3,884,606 | 5/1975 | Schrenk | 425/133.5 |
| 4,038,017 | 7/1977 | Langecker | 425/466 |

FOREIGN PATENT DOCUMENTS 1436907  5/1976  United Kingdom .

*Primary Examiner*—Caleb Weston
*Attorney, Agent, or Firm*—Wegner & Bretschneider

[57] ABSTRACT

A method of molding a tubular laminate comprising joining flows of a plurality of thermoplasticized resins together to prepare a laminated composite flow having two side edges, and then passing the composite flow having two side edges through an annular extrusion die to abut both side edges of the respective layers to each other in the die, thereby forming an integrated tubular flow.

3 Claims, 20 Drawing Figures

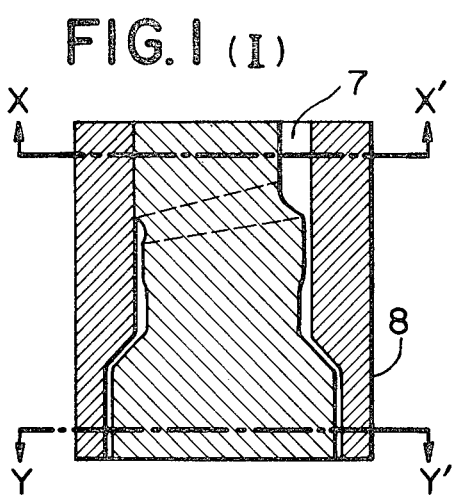
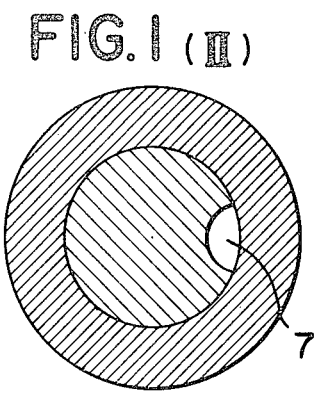
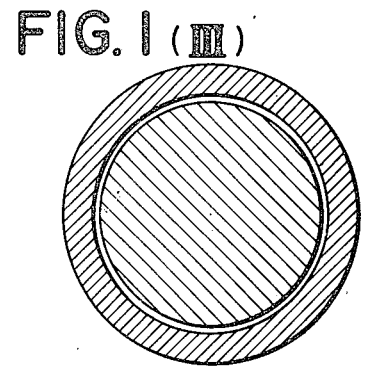
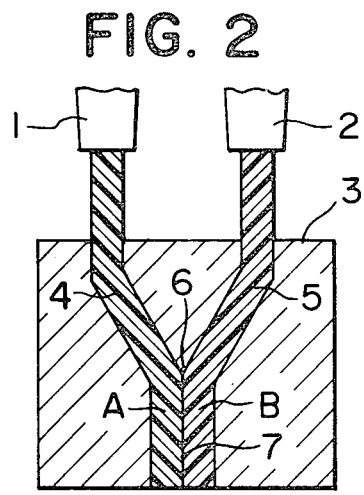
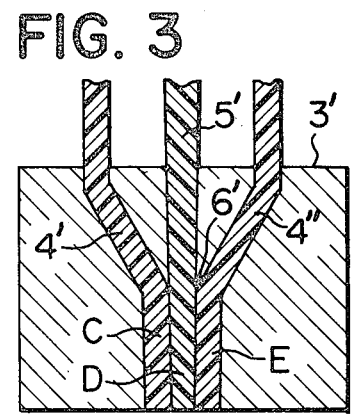
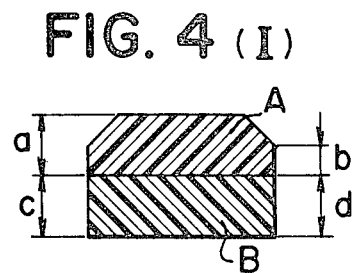
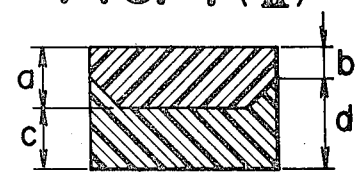

Figure 5:
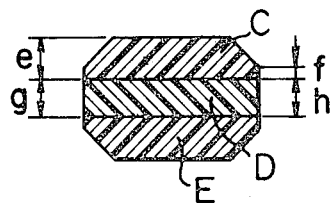

FIG. 5 (II) 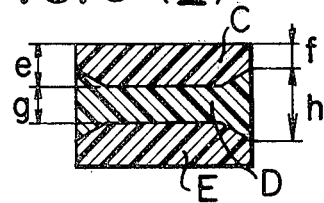

Figure 6:
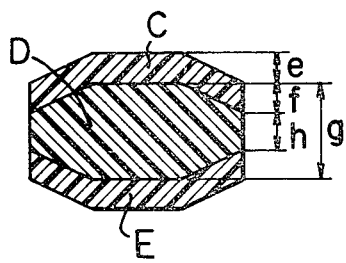

FIG. 6 (II) 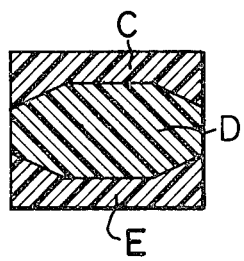
FIG. 6 (III) 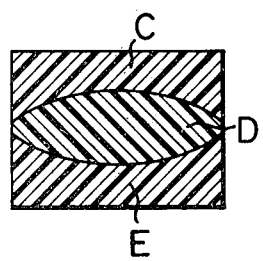

Figure 7:
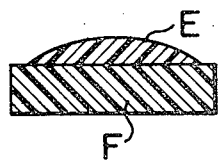

FIG. 7 (II) 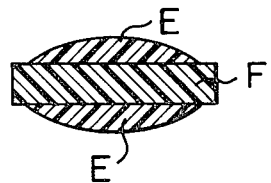
FIG. 7 (III) 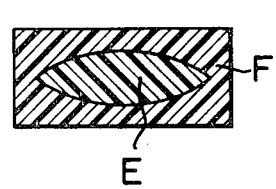

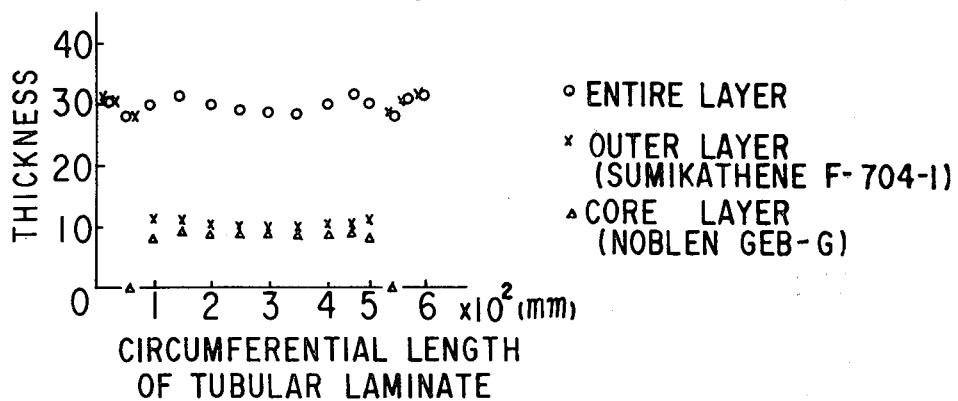
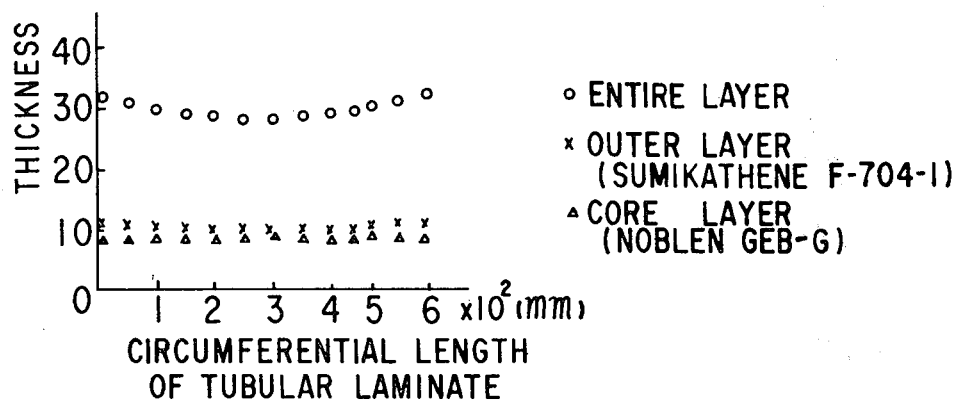

METHOD OF MOLDING TUBULAR LAMINATE

This invention relates to a method of modling a tubular laminate made of thermoplastic resins.

Tubular laminates are generally produced by a coextruding method in a inflation technique, which comprises coextruding a plurality of various resins at a same time and annularly laminating them in the annular die. In the conventional coextruding method known so far, resin flows extruded from each of extruders were annularly laminated integrally with a dimension nearly equal to that of the die outlet. Therefore, the annular die is required to have plural annular channels for resin flow, each formed through precise fabrication in a relatively small thickness and a relatively large diameter. Such precise fabrication has, however, a limit in its accuracy to thereby hinder smooth flow of the resins and result in increased ununiform distribution of sectional thickness in the laminate. It causes a high temperature as well due to the passage of the resin in the flow channel of such a small thickness, thus bringing about a difficulty in the production of laminate containing less thermostable resins. Those laminates containing expensive resins in a thin thickness are also unsuited to production in view of material cost since their thickness has to be increased due to the considerable ununiform distribution of sectional thickness, which leads to the increase in the cost for resin material. Moreover, an adhesive resin should be selected carefully, because a good bonding strength can not be attained due to the short distance from the laminating portion to the die outlet.

As foregoings, since the conventional coextruding method in the inflation technique requires spider dies or spiral dies in the same number as that of the laminated layers, and thus the structure in the joining point of resin flows in the die is much complicated, number of layers to be laminated is limited and the fabrication of the die apparatus suited to the production of laminate is difficult.

The main object of the present invention is to lower the ununiformity in the sectional thickness of each layer constructing the tubular laminate.

According to this invention, provided is a method of molding a tubular laminate comprising joining flows of a plurality of thermoplasticized resins together to prepare a laminated composite flow having two side edges, and then passing the composite flow having two side edges through an annular extrusion die to abut both side edges of the respective layers to each other in the die, thereby forming an integrated tubular flow.

In this invention, different from the above-mentioned conventional method which comprises joining and laminating each of resin flows in the form of annular flows at the same time, the resin flows are firstly modified into the laminated composite resin flow having two side edges, for example, in the form of plate or the like and subsequently the laminated composite flow thus obtained is passed through an annular extrusion die, e.g., an annular manifold die, to abut the both side edges of respective layers to each other, and then extruding the same as a tubular laminated flow from the die.

It is important in this invention that the number of the laminated layers at the abutted portion of the two side edges is the same as the number of the laminated layers at the middle portion in the composite resin flow when the two side edges are abutted to each other in the annular die, and that the ratio of the thickness is uniform as much as possible for each of the layers.

Generally, when the thickness of a laminated resin flow is decreased and the width of the flow from the flat flow to the annular flow is changed in the die, it is often experienced that respective resin layers show different spreading behaviors due to the influences such as the viscosity of each resin layer, adjacent interface (die inner wall or adjacent resin), die structure and the like, in which only the more spreadable resins are collected to the side edges while the less spreadable resins not reaching there.

Consequently, even if the thickness along the width of the laminated resin layer is made uniform at the joining point of the resin flows, all of the resin layers are not always present in the side edges and abutted to each other in the die. It is therefore desired, where resin layers much different in spreadability are joined and laminated, to form a more spreadable resin layer into a convexed layer with a thick middle portion and a thin edge portion and, if required, to form a less spreadable resin layer into a concaved layer with a thin middle portion, vice versa, so that the thickness ratio for each of the resin layers may be unified through the flow in the die. More specifically, for the cross sectional ratio between the adjacent resin layers at the joining point, the ratio of the more spreadable resin layer to the less spreadable resin layer is made greater at the middle portion than at the side edge.

Since the viscosity of a resin is a most significant factor on the spreadability of the resin and a lower viscosity resin shows higher flowability and spreadability, resin layers of relatively low viscosity are often selected as the foregoing convexed resin layer among the adjacent resin layers. But since the spreadability of a resin layer also varies depending on the effects such as adjacent interface (die side wall or adjacent resin interface), structure or the like, the spreadability can not be decided by the viscosity alone and, therefore, it is not a determinative factor.

In order to unify the ratio in the thickness along the circumferential direction in each of the resin layers upon abutting the side edges of the respective layer flows to each other in the die, it is required not only that the low viscosity resin layer takes a convexed structure at the joining point but also that the relation in the thickness to the adjacent resin layers at the middle and side edge portions or the like has to be determined more precisely. However, since the spreadability of the resin layer has a close concern with various factors such as resin viscosity, adjacent interface, flow rate, pressure, die structure or the likes, it is very difficult to theoretically determine the structure for each of the layers at the joining point while taking all of the above factors into considerations.

The inventors have succeeeded in obtaining tubular multi-layered molded products of less ununiformity in the section thickness with no substantial difficulty by providing, between a plurality of extruders and a die, an adaptor in which resin flows extruded from each of extruders are joined and by properly adjusting the structure of the adaptor while monitoring the ununiformity in the section thickness of the laminates actually extruded from the die. More specifically, the conventional annular manifold die is very expensive, having intricate curved surfaces and requiring a dimension precisely corresponded to the cylindrical body to be extruded and can not be modified with ease. While on the other hand, since such an adaptor in this invention can be fabricated only with simple flow channels of plate or like other configuration e.g., as shown in below-mentioned FIG. 2 or 3 in which the resin flows from each of the extruders are joined in a relatively integrated state, it can be modified or mended with much ease and is less expensive, and the design of the adaptor can easily be changed by observing the scattering of the ratio in the circumferential thickness of the composite resin flow extruded from the die.

This invention is to be described in more details by way of preferred embodiments referring to the attached drawings.

In the drawings, FIG. 1 shows an example of annular manifold die employable in this invention, in which FIG. 1(I) is a vertical cross section thereof, FIG. 1(II) is a transverse cross section taken along line X—X' in FIG. 1(I) and FIG. 1(III) is a transverse cross section taken along line Y—Y' in FIG. 1(I), FIG. 2 and FIG. 3 show vertical cross section of embodiments of adaptors according to this invention, FIG. 4 to FIG. 7 show examples of sectional configuration of the composite flow at the joining point in the adaptor and FIG. 8 to FIG. 12 are distribution charts for the thickness of extruded tube films, in which the abscissa represents a circumferential length of the tubular laminate and the ordinate represents a thickness of the laminate or each layer of the laminate.

In FIG. 1 and FIG. 2, resins A and B extruded from heads 1 and 2 of two extruders enter the resin flow channels 4 and 5 in an adaptor 3, and the flows of the both resins are laminated at a position 6 where the two channels are joined and then enter an annular manifold die 8 by way of a composite flow channel 7. A single channel die, for example, as shown in FIG. 1 can be used as the annular manifold die. Where the viscosity is approximately the same for both of the resins A and B, the cross sectional configuration of the composite flow laminated at the joining point 6 may be such that the ratio in the thickness along the width of the both layers is approximately uniform. On the contrary, where the two resins are much different in the viscosity, for example, if the viscosity of the resin A is lower than that of the resin B, a composite flow is formed in such a cross sectional configuration as shown in FIG. 4(I) or (II) in which the thickness a in the middle is greater than the thickness b in the side edge in the section of the resin flow of the layer A, and the relation: $(a/c) > (b/d)$ is satisfied, where a and b have the same meaning as above, c is the thickness of the middle and d is the thickness of the side edge of the layer B.

For three layer flows, if the total thickness of the entire layers at the outlet of the extruders can be the same as that in the above-mentioned two layer flows, a die having the same structure as that for the above-mentioned two layer flows can be used by merely converting the structure of the adaptor to that shown in FIG. 3 where three layers can be joined to a composite flow. In this case, if three types of resins C, D, E are employed, for example, the cross sectional configuration of the composite flow at the joining point takes such a sectional configuration as shown in FIG. 5(I) or (II) where the layer E or C takes a convexed section assuming that the viscosity of the resin C or E as the outer layer is lower than that of the core layer resin D. On the contrary, if the viscosity of the resin D as the core layer is lower than that of the resin C and E, the layer D may take a convexed structure as shown in FIGS. 6(I) to (III).

The adaptor may be replaced depending on the combination of resins, the number of laminate layer flows and the thickness for each of the layer.

The convexed structures for the section of the resin flow of lower viscosity are not always restricted to those shown in FIG. 4 to FIG. 6 but can take any other modifications. If the difference in the viscosity between the adjacent resins is extremely great, the resin E of a lower viscosity may be flown while laminated only to the middle portion of the resin F of a higher viscosity, for example, as shown in FIGS. 7(I) to (III).

According to this invention, it is possible to conduct the laminating extrusion with varying the types and the thickness ratio in each of the resin layers by merely replacing the adaptor while using one annular extrusion die (assuming that the total thickness for the extruded layers and the cylindrical diameter are not changed). Moreover, since the annular extrusion die contain no joining portion for the resin flows, the die can be of a simple structure almost similar to that of the single layer annular extrusion die, and conventional dies such as annular manifold die and cross head can be employed. Furthermore, since the adaptor having joining part is small and simple in structure, the apparatus cost is significantly reduced. Finally, since the adaptor can be replaced or mended with ease, the accuracy for the laminates can remarkably be improved.

Preferred embodiments of this invention are to be shown in the following examples, in which each of the resins used is set forth in Table 1.

TABLE 1

| Resin | Manufacturer | Trade name (Grade No.) | Apparent* melting viscosity (poise) |
|---|---|---|---|
| Polypropylene | Mitsui Toatsu K.K. | NOBLEN (GEB-G) | $1.1 \times 10^4$ |
| Polypropylene | Mitsubishi Yuka K.K. | NOBLEN (FE-3) | $3.6 \times 10^3$ |
| Polypropylene | Mitsubishi Yuka K.K. | NOBLEN (EX-6) | $6.8 \times 10^3$ |
| Polyethylene | Mitsui Polychemical K.K. | MIRASON (B-324) | $7.5 \times 10^3$ |
| Polyethylene | Sumitomo Kagaku K.K. | SUMIKATHENE (F-704-1) | $2.7 \times 10^3$ |

*The apparent melting viscosity was measured by a melt tension tester through a nozzle 1 mm$\phi$ × 10 mm, and under the conditions of shearing speed at 140 sec$^{-1}$ and temperature at 210° C.

COMPARATIVE EXAMPLE 1

Two flows of NOBLEN EX-6 and MIRASON B-324 substantially in equal amounts, which were previously thermoplasticized in different extruders respectively at 210° C., were laminated in a two layer-joining adaptor as shown in FIG. 2 to form a laminated composite flow 10 mm in thickness and 15 mm in width. Then, the flow thus obtained was introduced into an annular manifold die having an outlet ring 201$\phi$ in diameter and a core 200$\phi$ in diameter to form a laminated annular tube of which outer layer was NOBLEN EX-6 and then drawn from the die so as to form a tubular film 30$\mu$ in thickness. The two layers in the joining point in the adaptor were adjusted so that they formed parallel flows each in 4 mm thickness and each layer was extruded at about 14 Kg/hr.

Figure 8:
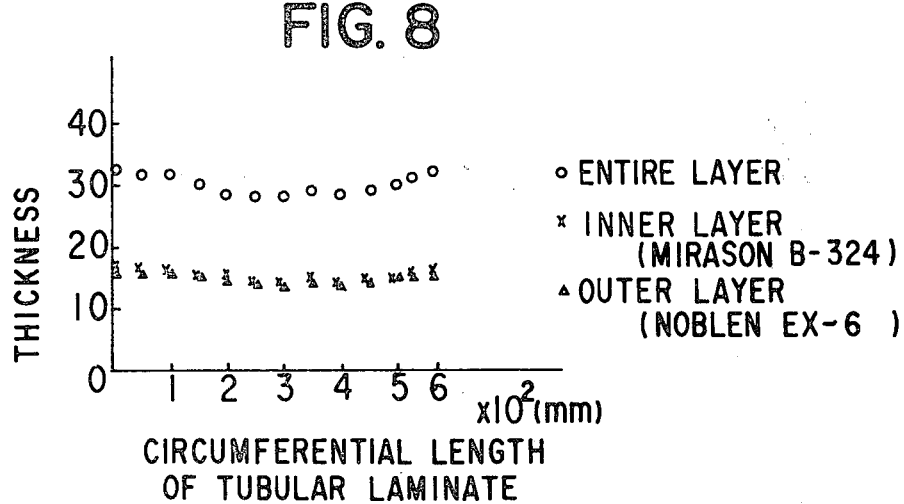

The tubular film thus obtained was cut out into a flat sample at the portion nearly corresponding to the abutted portion of the composite film and the thickness for each layer and that for the entire layer were measured. The results of the measurement are as shown in FIG. 8 where the ratio of inner layer/outer layer varies within ±6%.

Figure 9:
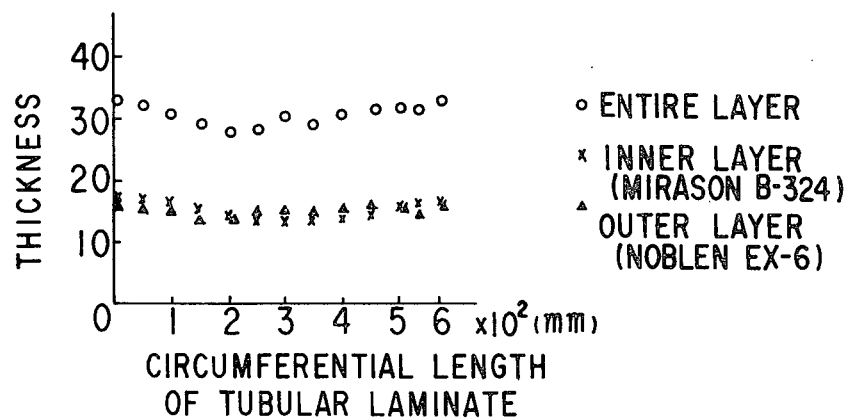

While on the other hand, using a double head composite annular manifold die (having the same outlet ring diameter and core diameter as above), a laminated tube was formed as a comparison, in which the inner layer was made of MIRASON B-324 and the outer layer was made of NOBLEN EX-6. The comparative laminated tube was cut out into a reference flat sample, and the thickness for each of the layers and the thickness for the total layers were measured. The results of the measurement are as shown in FIG. 9 where the ratio of inner layer/outer layer varies within ±10%, which is worse than the present invention.

Consequently, the use of the single layer die as the annular extrusion die according to this invention is much more advantageous as compared with the use of the conventional composite die as in the reference.

COMPARATIVE EXAMPLE 2

A flow of SUMIKATHENE F-704-1 at 210° C. thermoplasticized in an extruder was substantially bisected and each was introduced to the two outer layers of a three layers-joining adaptor as shown in FIG. 3 while a flow of NOBLEN FW-3 plasticized at the same temperature in another extruder was introduced to the core layer of the same adaptor. These three flows were joined to form a laminated composite flow 10 mm in thickness and 15 mm in width, and the flow thus obtained was then introduced into the same annular manifold die as shown in Comparative Example 1 to form a laminated annular tube and then drawn from the die as a tubular film 30μ in thickness. The composite flow in the joining point in the adaptor was adjusted so that the respective single layers form parallel layers of 4 mm/3 mm/4 mm in thickness, and each of the layers was extruded at about 10 kg/hr respectively.

Figure 10:
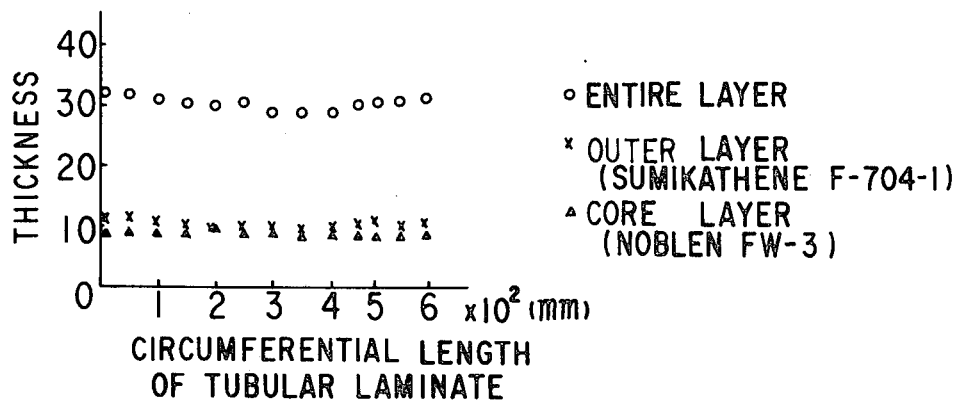

The composite tube was cut out into a flat sample at a position approximately corresponding to the abutted portion and the thickness for the outer layer (only one of the outer layers was measured since both of the outer layers were approximately of the same thickness), the core layer and the entire layers was measured. The results of the measurement are as shown in FIG. 10 where the ratio of core layer/outer layer varies within ±12%.

EXAMPLE 1 AND COMPARATIVE EXAMPLE 3

A composite film was extruded so that SUMIKATHENE F-704-1 formed the outer layers and NOBLEN GEB-G formed the core layer as in Comparative Example 2.

The distribution in the thickness along the width of a flat film cut out from the composite tube thus prepared was as shown in FIG. 11 where no core layer is present for 19% (about 11.5 mm) to the entire circumference near the abutted portion in the die and no complete three layered tube was prepared.

Then, the adaptor was modified as shown in FIG. 5(I) where both of the outer layers were convexed at the joining section (e=3 mm, ft=0 mm, g=h=4 mm in FIG. 5(I)) and the composite film was extruded in the same manner as above to obtain a complete three layered tube having the distribution in thickness as shown in FIG. 12. The ratio of core layer/outer layer in this tube varies within ±11%.

EXAMPLES 2 TO 7 AND COMPARATIVE EXAMPLES 4 TO 9

The extrusion was conducted as in Example 1 while varying the combination of the resins and the configuration of the adaptor (the used configurations are shown in FIG. 5(I) or FIG. 6). The results are shown in Table 2.

TABLE 2

| Outerlayer/core layer outer layer | f/e (mm/mm) | h/g (mm/mm) | Ratio of complete three layer in tubular laminate (%) | Layer not spreading for entire circumference | Variation in ratio of core layer/outer layer (%) | Remarks |
|---|---|---|---|---|---|---|
| F-704-1/FW-3/F-704-1 | 3/3 | 4/4 | 100 | none | ±12 | Comparative Example 2 |
| F-704-1/GEB-G/F-704-1 | 3/3 | 4/4 | 81 | core layer | — | Comparative Example 3 |
| F-704-1/GEB-G/F-704-1 | 0/3 | 4/4 | 100 | none | ±11 | Example 1 |
| F-704-1/EX-6/F-704-1 | 3/3 | 4/4 | 99 | core layer | — | Comparative Example 4 |
| F-704-1/EX-6/F-704-1 | 2/3 | 4/4 | 100 | none | ±10 | Example 2 |
| F-704-1/EX-6/F-704-1 | 1/3 | 4/4 | 100 | none | ±6 | Example 3 |
| B-324/GEB-G/B-324 | 3/3 | 4/4 | 100 | none | ±13 | Comparative Example 5 |
| B-324/GEB-G/B-324 | 2/3 | 4/4 | 100 | none | ±4 | Example 4 |
| FW-3/F-704-1/FW-3 | 3/3 | 4/4 | 100 | none | ±7 | Comparative Example 6 |
| B-324/FW-3/B-324 | 3/3 | 4/4 | 100 | none | ±9 | Comparative Example 7 |
| B-324/FW-3/B-324 | 3/3 | 3/4 | 100 | none | ±3 | Example 5 |
| EX-6/F-704-1/EX-6 | 3/3 | 4/4 | 96 | outer layer | — | Comparative Example 8 |
| EX-6/F-704-1/EX-6 | 3/3 | 3/4 | 99 | outer layer | — | Comparative Example 9 |
| EX-6/F-704-1/EX-6 | 3/3 | 2/4 | 100 | none | ±9 | Example 6 |
| EX-6/F-704-1/EX-6 | 3/3 | 1/4 | 100 | none | ±5 | Example 7 |

What is claimed is:

1. A method of molding a tubular laminate, wherein a plurality of flow of thermoplasticized resin are caused to come together at a joining point to prepare a laminated composite flow having a plurality of layers and two side edges, and said composite flow is passed through an annular extrusion die so that said side edges come to abut within said die, thereby forming an integrated tubular flow, characterized in that at least one layer in said composite flow has a lower viscosity than the other layer(s) and said layer of the lower viscosity is formed into a convex cross sectional shape in the preparation step of said composite flow.

2. The method according to claim 1, wherein said flows of thermoplasticized resins are caused to come together in an adaptor disposed upstream of said annular extrusion die and provided with a plurality of inlet passages which meet to a single outlet passage.

3. The method according to claim 1 or 2, wherein said composite flow is substantially flat prior to its insertion into said extrusion die.

* * * * *